United States Patent Office 3,065,204
Patented Nov. 20, 1962

3,065,204
PREPARATION OF SOLID POLYCARBONATE
Joseph J. Dietrich, Copley, and Roger D. Swigert, Akron, Ohio, assignors, by mesne assignments, to Pittsburgh Plate Glass Company
No Drawing. Filed Aug. 1, 1958, Ser. No. 752,422
8 Claims. (Cl. 260—47)

The present invention deals with the manufacture of polycarbonates. More particularly, it involves preparation of solid particulate polycarbonate compositions.

Polycarbonates exemplified by but not limited to Bisphenol A (p,p'-isopropylidene diphenol) polycarbonates in one method are prepared by phosgenating an aqueous sodium hydroxide solution of Bisphenol A. Including a water insoluble liquid organic solvent for the polycarbonate product such as a normally liquid partially chlorinated hydrocarbon in the reaction medium undergoing phosgenation is often advantageous. Thus, polycarbonate product is at the conclusion of the preparation present as solute dissolved in the organic solvent.

Many occasions and reasons dictate the desirability of having the high molecular weight polycarbonates in the form of solid particulate compositions. For example, use of polycarbonates as molding powders means they should be in the form of particulate (finely divided) solids. It is also generally more convenient and less expensive to handle and transport solids rather than liquids. Liquids require metal drums or tank cars. Solids are readily bagged or packaged in non-metallic containers. With organic solutions of polycarbonate, transportation charges include the cost of shipping the solvent. Even with especially good polycarbonate solvents, a maximum of about 30 percent by weight of polycarbonate may be dissolved. Hence, the solvent comprises a predominant weight proportion of the solution and is a considerable factor in cost of shipping.

According to this invention, granular or particulate solid polycarbonate compositions of commendable bulk densities often as high as 20 pounds per cubic foot or denser and other desired characteristics are obtained by a novel process for separating polycarbonate solute from polycarbonate solutions. The process accomplishes this separation with particular efficiency and facility.

Now it has been discovered that dissolved polycarbonate may be separated from solution as a granular, high bulk density solid composition by controllably reducing the dissolving capacity of the polycarbonate solvent of the solution until precipitation is about to or just commences and thereupon adding a small amount of solid polycarbonate. This addition of solid polycarbonate accelerates greatly precipitation of polycarbonate from solution.

Thus, an organic solution of polycarbonate is diluted with a non-solvent for the polycarbonate (the non-solvent being miscible with the polycarbonate organic solvent under prevailing conditions) using only sufficient non-solvent to establish a liquid medium saturated with polycarbonate. In essence, this amounts to providing a liquid medium essentially saturated with polycarbonate including both non-solvent and solvent which by virtue of the non-solvent has less capacity to dissolve polycarbonate than if only the polycarbonate solvent were present. The degree of dilution is such that the resulting liquid is at its polycarbonate cloud point, i.e., formation of solid phase commences as indicated by the appearance of a haze in the liquid medium.

Provision of a liquid medium at its cloud point is accomplished usually by the gradual addition (continuous or incremental) of non-solvent to the solution until the haze appears. When the haze is in evidence, addition is halted. The amount of non-solvent so added is thus preferably limited to only that necessary to attainment of the cloud point condition. Some leeway is permissible but avoided is use of considerably more than the minimum amount of non-solvent required to reach the cloud point, or any amount which causes precipitation to occur rapidly.

Once the liquid medium at its cloud point is established, solid particulate polycarbonate is added and thereafter formation of solid particulae or granular polycarbonate occurs at an accelerated rate. Mose of the time, an almost transparent, sponge-like, non-sticky solid polycarbonate forms within five or ten minutes after addition of the solid polycarbonate. Agitation of this product, preferably in the mother liquor, transforms it into granular form. Expedients suitable to separate solid granular polycarbonate from the liquid include centrifugation, filtration, decantation, vaporization of the liquids and the like.

The addition of solid polycarbonate to the liquid medium at its cloud point is instrumental and influences profoundly the obtention of granular polycarbonate. One strikingly noticeable consequence is the drastic reduction in the period of time required for formation of granular polycarbonate. In one illustrative situation, use of solid polycarbonate reduced from six to two hours the time required for formation of granular polycarbonate.

This effect of solid polycarbonate is realized using widely varying amounts. Usually, at least 0.1 percent by weight of the polycarbonate in solution in the liquid medium is adequate. Larger amounts also function and a typically useful range is between 0.1 and 5 percent by weight. Economic considerations, not operability, are principal deterrents to the use of even larger amounts.

Moreover, for best results the added solid polycarbonate should correspond approximately to the granulated product being sought. Thus, in a batch operation a portion of granular product prepared in a previous batch is ideal. It, nevertheless, is possible to use chemically different granular polycarbonates for this purpose, with the reservation that some contamination is to be accepted.

Subsequent to addition of solid polycarbonate the liquid medium is agitated over a finite period of time, typically from 30 to 180 minutes, during which the granulated product is provided. Depending upon the objectives sought and particular liquids (solvent and non-solvent), it may or may not be advisable to dilute the liquid medium further with non-solvent. With many non-solvents such as aliphatic hydrocarbons, the degree of dilution which attains a cloud point condition often will serve to precipitate essentially all polycarbonate during the subsequent steps. If necessary and desirable, however, further non-solvent may be added to insure or facilitate complete precipitation. Obviously, less than complete precipitation of solute is possible, although from a practical standpoint the better practice is to recover at least 50, and usually better than 75, percent of the polycarbonate as solid product.

Quite important to the physical characteristics of the solid polycarbonate obtained is the sequence of establishing a liquid medium comprising organic solvents and non-solvents at its cloud point, adding solid polycarbonate to the liquid medium and thereafter forming solid granular polycarbonate in the resulting liquid medium. As a result, the solid polycarbonate is in the form of fine granular particles, usually uniform in size, and easily separable from the mother liquor by mechanical expedients such as decantation, centrifugation or filtration. When so separated, a commendably high bulk density granular product is obtained.

Effective performance of the process herein described is not limited to specific solvents and non-solvents.

Any chemically inert non-solvent may be used. All liquid organic non-solvents for the polycarbonate miscible with the polycarbonate solvents under the prevailing conditions are useful. Those organic liquids in which less than one part and preferably less than 0.5 part polycarbonate per 100 parts of liquid may be considered non-solvent for the purposes here intended. Two ideal classes of organic liquids are the normally liquid alcohols and aliphatic hydrocarbons. These alcohols are typified by the monohydric aliphatic alcohols, methanol, ethanol, n-propanol, isopropanol, allyl alcohol, n-butanol, isobutanol, secondary butanol, n-amyl alcohol, isoamyl alcohol, n-hexyl alcohol and mixtures thereof. Besides these monohydric alcohols, the dihydric alcohols such as ethylene glycol and diethylene glycol may be used. Aliphatic hydrocarbons exhibiting the appropriate physical characteristics (miscible sufficiently with the polycarbonate solvent and non-solvent for the polycarbonate) are in the main the normally liquid aliphatic hydrocarbons of 5 to 20 carbon hydrocarbons, and notably 6 to 8 carbon hydrocarbons. Specifically these include n-pentane, n-hexane, 2-methyl pentane, 3-methyl pentane, 2,2-dimethyl butane, 2,3-dimethyl butane, the various heptanes including normal heptane and isomers such as 2-methyl heptane, 3-methyl heptane, 2,2-dimethyl heptane, 2,3-dimethyl heptane, 3-ethyl heptane, 2,2,3-trimethyl butane, normal octane, normal nonane, normal decane, normal undecane, normal dodecane, normal tridecane, normal pentadecane as well as the various isomers of these longer chain hydrocarbons. Mixtures of such aliphatic hydrocarbons are suitable. Accordingly, the various commercial compositions principally comprised of aliphatic hydrocarbon mixtures such as those obtained as particular cuts obtained during the refining of gasoline, i.e., Stoddard Solvent, are included.

Besides these non-solvents, still other organic liquids such as carbon tetrachloride, other fully halogenated aliphatic hydrocarbons and various aromatic compounds such as the trichlorobenzene isomers, dichlorobenzene are available.

It will be appreciated that depending upon the specific polycarbonate solvent and non-solvent used in combination in the performance of this invention different conditions may be optimum. For example, using as a non-solvent methanol requires dilution of a methylene chloride polycarbonate solution with an amount of alcohol equivalent to about half of the solution's volume. On the other hand, with normal hexane a larger relative volume is required to attain the cloud point of a comparable polycarbonate methylene chloride solution.

Temperature of the solution and liquid system is selected principally for convenience of operation. Thus, since many of the polycarbonate solvents and non-solvents are volatile at moderate temperatures, the temperatures are sufficiently low to avoid undue volatilization of either liquid. Nevertheless, superatmospheric pressures may be used to suppress volatilization and permit higher temperatures. Typical temperatures of operation are between 0° C. and 50° C.

The following examples illustrate the manner in which the present invention may be performed:

*Example I*

Methylene chloride solutions of Bisphenol A polycarbonate solution was prepared by procedures substantially as follows:

Into a three-necked, one liter glass flask, 0.3 mole of Bisphenol A, 0.84 mole of sodium hydroxide, 310 milliliters of water and 180 milliliters of methylene chloride were charged and mixed. Thereafter, with gentle agitation and the temperature maintained at about 25° C., gaseous phosgene was gradually metered in until 0.34 mole had been added. Agitation of the reaction mixture subsequent to discontinuing the phosgene addition was continued for 2 hours. Thereafter, the agitation was discontinued and a resulting reaction medium was allowed to separate into two phases. The heavier phase, a methylene chloride solution of polycarbonate was phase separated, and water washed free of chloride ion.

*Example II*

Some 200 milliliters of a methylene chloride solution of Bisphenol A polycarbonate obtained by a process of the type described in Example I and containing 9.13 percent polycarbonate by weight was charged to a 500 milliliter glass flask fitted with a motor-driven, Tru-Bore stirring assembly and a 25 milliliter burette. With the contents of the flask at room temperature (about 25° C.), 142 milliliters of Apco 140 (a commercial mixture of liquid aliphatic hydrocarbons having a flash point of 140° F. obtained as a cut in the refinement of gasoline and sold by the Anderson Pritchard Oil Company) was added to reach the cloud point.

Thereupon 2 grams of a solid granular Bisphenol A polycarbonate was added. After 5 minutes, a sponge-like, nearly transparent precipitate formed. The resulting liquid medium was then stirred for 2 hours and the granulated product separated by filtration and oven dried at 110° C. This product had a buk density of 10.9 pounds per cubic foot.

*Example III*

Duplicating Example II, except that 160 milliliters of Apco 360 (another such commercial mixture of liquid aliphatic hydrocarbons marketed by Anderson Pritchard Oil Company but having a flash point of 100° F.) was added to provide the cloud point, provided a granular solid polycarbonate having a bulk density of 10.9 pounds per cubic foot.

*Example IV*

Example II was duplicated using 150 milliliters of Stoddard Solvent (a commercial mixture of liquid aliphatic hydrocarbons). A granular solid polycarbonate product was obtained having a bulk density of 16 pounds per cubic foot.

Procedures in which no solid polycarbonate was added required some 6 hours of stirring compared with the 2 hours used in the examples to obtain a reasonable product.

The procedure of Example II may be duplicated using n-hexane, n-pentane, methanol, ethanol, isopropanol and n-hexanol, among others, with similar results.

This process is especially effective in recovering particulate granular polycarbonates from solutions provided by good polycarbonate solvents. A good solvent is one in which at least about 3 parts and preferably 5 or more parts of polycarbonate per 100 parts by weight of solvent will dissolve. Such solvents are principally highly polar organic solvents. The normally liquid partially halogenated, notaby chlorinated, aliphatic hydrocarbon of 1 to 4 carbon atoms having at least 1 carbon atom linked to both a hydrogen atom and a chlorine atom are among the best of the good solvents. They are exemplified by chloroform, methyl chloride, methylene chloride, ethylene chloride, beta,beta'-dichloroethyl ether, acetylene dichloride, dichloroethylene and partially chlorinated propanes and butanes. Other solvents are tetrahydrofuran and the partially water insoluble light alkyl ethers such as diethyl ether and isopropyl ether.

As a general rule, polycarbonate solutions should contain between 5 and 30 percent by their weight of polycarbonate to perform the process here effectively and economically.

In lieu of methylene chloride solutions of Bisphenol A polycarbonate specifically illustrated in the examples, the invention is applicable to the use of any of the afore enumerated generally represented solvents. It is also applicable to other higher molecular weight polycarbonates besides Bisphenol A polycarbonates. Polycarbonates derived from the phosgenation in the presence of base of other alkylidene bisphenols are also thus recoverable in the manner of this invention. Among these polycarbonates are those prepared from alkylidene bisphenols such as:

(4,4'-dihydroxy-diphenyl)-methane
1,1-(4,4'-dihydroxy-diphenyl)-cyclohexane
2,2'-methylene bis(4-methyl-6-tertiary butyl phenol)
2,2'-methylene bis(4-ethyl-6-tertiary butyl phenol)
4,4'-butylidene bis(3-methyl-6-tertiary butyl phenol)
4,4'-thiobis(3-methyl-6-tertiary butyl phenol)
1,1-(4,4'-dihydroxy-3,3'-dimethyl-diphenyl)-cyclohexane
2,2-(2,2'-dihydroxy-4,4'-di-tert-butyl-diphenyl)-propane
3,4-(4,4'-dihydroxy-diphenyl)-hexane
1,1-(4,4'-dihydroxy-diphenyl)-1-phenyl-ethane
2,2-(4,4'-dihydroxy-diphenyl)-butane
2,2'-(4,4'-dihydroxy-diphenyl)-pentane
3,3'-(4,4'-dihydroxy-diphenyl)-pentane
2,2'-(4,4'-dihydroxy-diphenyl)-3-methyl-butane
2,2'-(4,4'-dihydroxy-diphenyl)-hexane
2,2'-(4,4'-dihydroxy-diphenyl)-4-methyl-pentane
2,2'-(4,4'-dihydroxy-diphenyl)-heptane
4,4-(4,4'-dihydroxy-diphenyl)-heptane
2,2-(4,4'-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane
2,2-bis(3,3'-dimethyl-4,4'-dihydroxy-diphenyl)-propane Moreover, the principles of this invention are applicable to higher molecular weight polycarbonates in general and are not limited to the manner in which they are prepared. For example, polycarbonates obtained by alkali catalyzed interchange of a diaryl carbonate and Bisphenol A may be treated as herein described. Illustrative of other polycarbonates are: mixed polycarbonates derived from two or more of the above alkylidene bisphenols; polycarbonates prepared by reaction of diols with bischloroformates of diols including aromatic, cycloaliphatic and aliphatic diols; mixed polycarbonates derived from alkylidene bisphenols and aliphatic diols; polycarbonates prepared by ester interchange between a diester of a carbonic acid and a diol. Depending, of course, upon the particular constituents of the polycarbonate, such polycarbonates may range from 800 to 30,000 or higher in molecular weight. As a rule, they are characterized in being comprised of at least 5, often 10 to 300 or more, carbonate linkages per molecule.

While the invention has been described by reference to specific details of certain embodiments, it is to be understood that it is not intended that the invention be construed as limited to such details except insofar as they are included in the appended claims.

We claim:
1. A method of preparing solid polycarbonate composition which comprises diluting an organic solvent solution of polycarbonate of a diol of above 800 molecular weight with sufficient liquid non-solvent miscible with the organic solvent of said solution for said polycarbonate to establish a liquid medium at its cloud point, adding a small amount of at least 0.1 percent by weight basis the weight of said dissolved polycarbonate of solid particulate polycarbonate of a diol of above 800 molecular weight to the medium and thereafter recovering the resulting precipitated polycarbonate of a diol.

2. A method of preparing solid polycarbonate composition which comprises diluting an organic solvent solution of polycarbonate of a diol of above 800 molecular weight with sufficient liquid non-solvent miscible with the organic solvent of said solution for said polycarbonate to thereby establish a liquid medium at its cloud point, adding a small amount of at least 0.1 percent by weight basis the weight of said dissolved polycarbonate of solid particulate high molecular weight polycarbonate of a diol to the liquid medium, agitating the medium, forming a solid granular phase of polycarbonate of a diol therein and separating said solid phase.

3. A method of preparing solid high molecular weight polycarbonate composition which comprises diluting an organic solvent solution of a high molecular weight polycarbonate of a diol with liquid organic non-solvent miscible with the organic solvent of said solution for the polycarbonate of a diol to the extent that a liquid medium is formed which is at its polycarbonate cloud point, adding a small amount of at least 0.1 percent by weight basis the weight of said polycarbonate dissolved in the liquid medium of solid particulate high molecular weight polycarbonate of a diol to this medium, agitating this solid containing medium, forming solid granular polycarbonate of a diol during the agitation and recovering said solid granular polycarbonate.

4. A method of recovering solid granular polycarbonate composition which comprises adding a small amount of at least 0.1 percent by weight, basis the weight of the polycarbonate dissolved in the liquid medium, of solid particulate high molecular weight polycarbonate of a diol to a liquid medium at its cloud point, the polycarbonate dissolved in said liquid medium being a high molecular weight polycarbonate of a diol, said liquid medium containing an organic solvent for said polycarbonate and a liquid non-solvent miscible with said organic solvent for said polycarbonate, thereafter agitating the medium, forming solid granular high molecular weight polycarbonate of a diol therein and recovering said solid granular polycarbonate.

5. The method of claim 4 wherein the organic solvent is a liquid partially chlorinated aliphatic hydrocarbon.

6. The method of claim 4 wherein the polycarbonate is p,p'-isopropylidene diphenol polycarbonate.

7. A method of preparing solid high molecular weight alkylidene bisphenol polycarbonate composition which comprises diluting an organic solution of alkylidene bisphenol polycarbonate having a molecular weight of at least 800 and containing at least 5 carbonate linkages per molecule dissolved in partially chlorinated aliphatic hydrocarbon of 1 to 4 carbons with a liquid organic non-solvent miscible with the partially chlorinated aliphatic hydrocarbon solvent to the extent that a medium is formed at its polycarbonate cloud point, adding at least 0.1 percent by weight of the dissolved alkylidene bisphenol polycarbonate of solid particulate alkylidene bisphenol polycarbonate of above 800 molecular weight to this medium, agitating this solid containing medium, forming solid high molecular weight granular polycarbonate during the agitation and recovering such solid polycarbonate.

8. The method of claim 7 wherein from 0.1 to 5 percent solid polycarbonate by weight of the dissolved polycarbonate is added.

References Cited in the file of this patent
FOREIGN PATENTS
523,543    Belgium _____ Jan. 30, 1955

OTHER REFERENCES
Weissberger: "Technique of Organic Chemistry," vol. III, pages 475–479, 480 and 481, Interscience (1956). Copy in Division 60.

UNITED STATES PATENT OFFICE
CERTIFICATE OF CORRECTION

Patent No. 3,065,204

November 20, 1962

Joseph J. Dietrich et al.

It is hereby certified that error appears in the above numbered patent requiring correction and that the said Letters Patent should read as corrected below.

Column 2, line 8, for "particulae" read -- particulate --; line 9, for "Mose" read -- Most --; column 4, line 53, for "notaby" read -- notably --.

Signed and sealed this 25th day of February 1964.

(SEAL)
Attest:
ERNEST W. SWIDER

Attesting Officer

EDWIN L. REYNOLDS

Acting Commissioner of Patents